Feb. 2, 1932. F. H. OWENS 1,843,172
PRINTING APPARATUS
Filed July 13, 1927
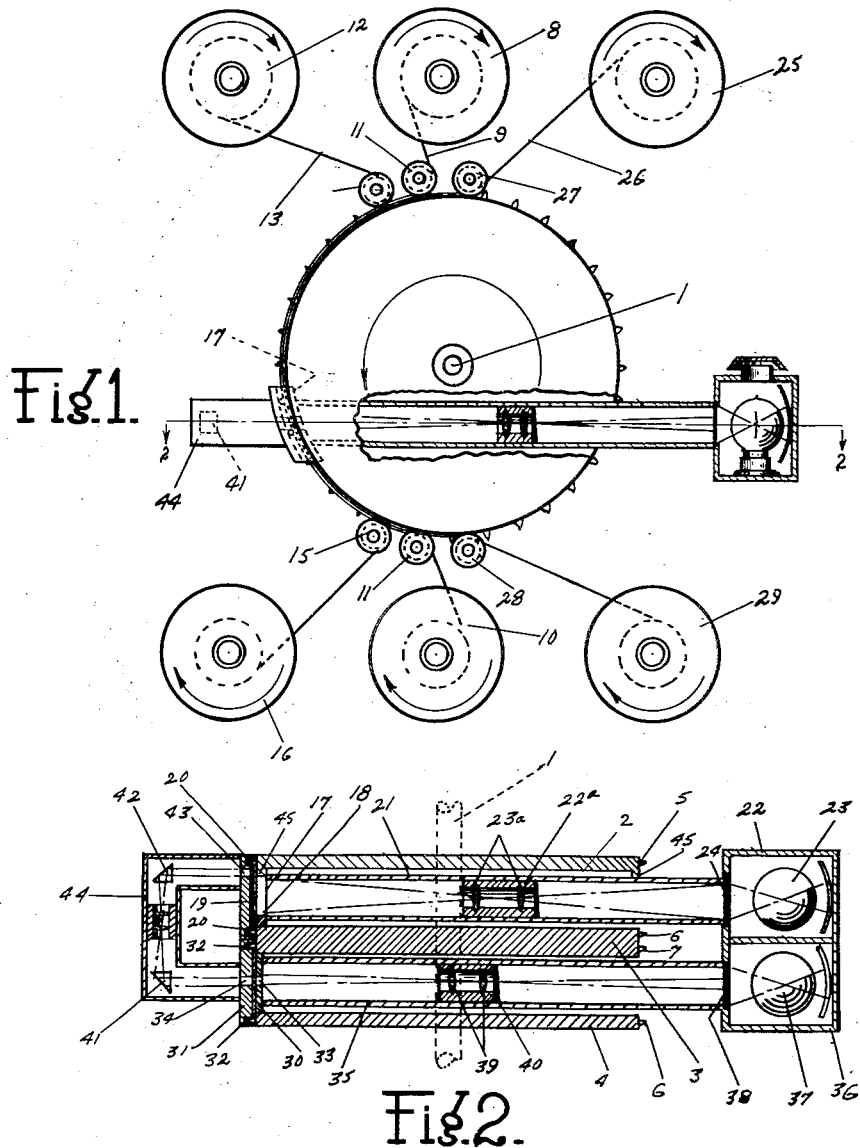
INVENTOR.
FREEMAN H. OWENS.
BY John B. Brady
ATTORNEY Patented Feb. 2, 1932

1,843,172

UNITED STATES PATENT OFFICE

FREEMAN H. OWENS, OF NEW YORK, N. Y.

PRINTING APPARATUS

Application filed July 13, 1927. Serial No. 205,449.

My invention relates particularly to means for printing motion picture film and has for its primary object the provision of means for simultaneously making contact prints from a picture negative film onto a positive film and optically printing a sound record from a sound negative film onto the same positive film.

Another object is to perform such printing operation not only simultaneously but continuously.

A still further object lies in the provision of means for moving all of the films by a single driving apparatus.

Other objects and advantages in details of construction and operation will be apparent as the description proceeds, reference now being had to the figures of the drawings, wherein like reference numerals indicate like parts.

In the drawings:—

Figure 1 is a diagrammatic side view, partly in section, illustrating the assembly of my improved printing apparatus.

Figure 2 is a slightly enlarged cross sectional view taken on the line 2—2 of Figure 1.

There is provided a single rotatable shaft 1 adapted to be rotated at a constant speed by any suitable power device (not shown). Mounted for rotation with this shaft are three spaced sprocket members 2, 3 and 4. The sprocket member 2 is provided with peripheral teeth 5 and the sprocket member 4 is provided with similar teeth 6. The sprocket member 3 is a double sprocket, provided with two rows of teeth 6 and 7.

Suitably fed from a reel 8 is a strip 9 of negative motion picture film having developed images thereon. This picture negative strip is engaged with the teeth 5 of the sprocket member 2 and with the teeth 6 on the sprocket member 3, and passes around one side of these sprocket members, as shown clearly in Figure 1, whereby such film may be moved downwardly to the take up reel 10. The film 9 is held in engagement with the sprocket teeth as above described, by means of the rollers 11.
Also fed in any suitable manner from a reel 12 is a strip of positive film 13 adapted to receive the printed images from the negative film 9. This film 13 passes around the guide roller 14 and then around the same side of the sprocket members 2 and 3 as the negative film and also in contact therewith. The positive film 13 leaves the sprocket members around the roller 15 and is suitably wound up on the take up reel 15. The teeth 5 and 6 of the sprocket members 2 and 3 respectively pass through the usual perforations in both the positive and negative films whereby such films are moved together continuously and uniformly by such sprocket members.

A film guide 17 is suitably located adjacent the periphery of the sprocket members 2 and 3 and the negative and positive films 9 and 13 pass over this film guide, the negative film being in engagement therewith. This film guide 17 is provided with an opening 18 extending substantially across the width of the same for a purpose to be described. A suitable film gate 19 is provided on the opposite side of the films 9 and 13 and adapted to hold such films in engagement with each other and with the film guide 17. This film gate 19, as shown clearly in Figure 2, is provided with notches adjacent the edges into which the sprocket teeth 5 and 6 project through the film strips 9 and 13. These notches or grooves are indicated at 20.

Mounted between the sprocket members 2 and 3, slightly below the shaft 1 is a horizontal housing 21, one end of which may provide the film guide 17 and the opposite end of which projects beyond the sprocket members and is provided with a lamp housing 22 within which is the lamp 23 receiving its electric current from any suitable source. A ground glass 24 or other diffusing screen suitably diffuses the light from the lamp 23 as it passes through the housing 21. Located within this housing 21 is a lens mount 22a within which are mounted the lenses 23a. Any suitable means may be provided for focusing these lenses. It will be clear from the foregoing that rotation of the sprocket members 2 and 3 will result in the simultaneous and continuous movement of the negative film 9 and the positive film 13 past the exposure opening 18 in the film guide 17. The light from the lamp 23 passing through the lenses 23a will thus expose the images on the negative film 9 onto the positive film 13.

Fed from a suitable reel 25 is a negative sound film 26 bearing a photographic sound record. This sound film passes under the roller 27 into engagement with the teeth 6 and 7 of the sprocket members 4 and 3 respectively. After passing around the periphery of these sprocket members on one side, the film 26 passes over the guide roller 28 and is suitably fed onto the take up reel 29. It will thus be seen that the film 26 will be moved simultaneously with and uniformly with the films 9 and 13 due to the fact that the sprocket member 4 is mounted on the same shaft as the other sprocket members and particularly due to the fact that the same sprocket member 3 serves to move the sound film as well as the negative picture film and the positive film.

A film guide 30 is suitably located between the sprocket members 3 and 4 and the sound film 26 passes over this guide. A film gate 31 is also provided on the opposite side of the sound film 26 whereby to hold the same in engagement with the guide 30. The film gate 31 is provided with grooves 32 to receive the sprocket teeth 6 and 7 projecting through the sound film 26. The film guide 30 and film gate 31 are provided with aligned exposure openings 33 and 34 respectively, for a purpose to be described.

Located between the sprocket members 3 and 4 is a housing 35, one end of which may provide the film guide 30. The opposite end of the housing 35 is provided with a lamp casing 36 within which is a suitable lamp 37, the rays from which pass through a diffusing screen or ground glass 38 and through lenses 39 mounted in a suitable lens mount 40. These lenses may be focused in any suitable manner. After passing through the lenses 39, the light rays pass through the exposure openings 33 and 34, and consequently through the sound film 26. After passing through the sound film, the light rays from the lamp 37 pass to a prism or other reflecting device 41, where the rays are turned at right angles and reflected to a second prism 42, which again turns the rays at right angles and directs them through an opening 43 located in one edge of the film gate 19 and in alignment with one edge of the positive film 13. The prisms 41 and 42 are of course suitably housed in a casing 44.

Of course the openings 33 and 34 in the film guide 30 and film gate 31 are so positioned as to permit the passage of the sound record on the sound film 26 in alignment with such openings. It will be understood that this opening may be located at either edge of the film guide and gate 30 and 31, or in the center as shown in the drawings for convenience. The location of these openings will of course depend upon the position of the sound record on the sound film 26. It will also be observed that the sprocket member 2 is provided with a peripheral shoulder 45 which engages with the negative film 9 directly behind the exposure opening 43 for the sound record. This provides a film gate at the point where the sound record is printed upon the positive film 13, and with the film guide 17, serves to mask the light from the lamp 23 away from such point.

The operation of my improved printing apparatus is as follows:—As the sprocket members rotate, the negative film 9 and positive film 13 will be moved synchronously, as will the negative sound film 26. The light from the lamp 23 will print the picture images on the film 9 directly on the positive film 13 by contact printing. As such film passes between the film guide 17 and gate 19, simultaneously therewith the sound record on the film 26 will be projected by means of the lights from the lamp 37 through the film guide and gate 30 and 31 to the prisms 41 and 42, and then to the same positive film 13 along one edge thereof between the picture images and the perforations of said positive film, but from the opposite side of said positive film from that on which the picture negative is located.

From the foregoing, it will be clear that I have provided a single apparatus with which one can simultaneously make contact print of the images of a negative film on a positive film and of a sound record onto the same positive film, the latter being printed optically.

Of course, many changes may be made in detail without departing from the spirit and scope of my invention. I do not limit myself therefore to the exact structure shown and described other than by the appended claims.

I claim:—

1. A printing apparatus comprising a single rotatable shaft, a plurality of spaced sprocket members thereon, a negative picture film, and a positive film movable by certain of said sprockets in contact with each other, a separate sound film movable simultaneously and synchronously with said negative and positive films by certain of said sprockets, means for printing picture images from said negative film on said positive film and means for optically printing a sound record from said sound film on said positive film.

2. A printing apparatus comprising a single rotatable shaft, a plurality of spaced sprocket members thereon, a negative picture film, and a positive film movable by certain of said sprockets in contact with each other, a separate sound film movable simultaneously and synchronously with said negative and positive films by certain of said sprockets, means for printing picture images from said negative film on said positive film and means for optically printing a sound record from said sound film on said positive film, said sound record being printed on said positive film from a side opposite said negative film.

3. A printing apparatus comprising a negative picture film and a positive film movable together and in contact, a film guide over which said films move, an aperture in said guide, a lamp for printing images from said negative film on said positive film through said aperture, a lens through which the light from said lamp passes, a separate sound film, means comprising sprocket members mounted on and driven by a common shaft for moving all of said films synchronously, a film guide over which said sound film passes, an aperture in said guide, a lamp for illuminating a sound record on said sound film, the light from said lamp passing through said aperture, and optical means for printing said illuminated sound record on said positive film.

4. A printing apparatus comprising two single sprocket members and a double sprocket member spaced between said single sprocket members, means for rotating all of said sprocket members synchronously, a negative picture film and a positive film movable together and in contact by one of said single sprocket members and said double sprocket member, a separate sound film movable by said double sprocket member and the other of said single sprocket members, means including a light source, lenses, film guide and exposure aperture for printing the images from the negative film on said positive film, and means including a light source, lenses, film guide, exposure apertures and optical means for printing a sound record from said sound film on said positive film.

5. A printing apparatus comprising two single sprocket members and a double sprocket member spaced between said single sprocket members, means for rotating all of said sprocket members synchronously, a negative picture film and a positive film movable together and in contact by one of said single sprocket members and said double sprocket member, a separate sound film movable by said double sprocket member and the other of said single sprocket members, means including a light source, lenses, film guide and exposure aperture for printing the images from the negative film on said positive film, and means including a light source, lenses, film guide, exposure apertures and optical means for printing a sound record from said sound film on said positive film, said first named single sprocket having a flange acting as a film gate for said positive film at the point of exposure of said sound record.

6. The method of printing a combined picture and sound film comprising the steps of moving a negative picture film, together with and in contact with the emulsion side of a sensitized film, past an illuminated aperture; moving a negative sound film synchronously with said films past a separate illuminated aperture, and directing light from said sound film to the opposite side of and through said sensitized film, whereby the images on said negative films are printed simultaneously on said sensitized film.

7. A printing apparatus comprising a negative picture film and a positive film movable together and in contact, a separate sound film, single driving means for synchronously moving all of said films, means for printing images from said picture film on the emulsion side of said positive film, and means for projecting a sound record from said sound film to the opposite side of and through said positive film, whereby said sound record is printed on said positive film simultaneously with said picture images.

8. The method of simultaneously printing a synchronized sound and moving-picture record on one positive film from separate films bearing sound and picture records respectively, which consists in progressively exposing one side of the emulsion of the first said film to rays of light from one source directed through the picture-record-film while the records thereon are in contact with the emulsion of the first said film and exposing the opposite side of said emulsion to rays of light from a second source directed through the sound-record film from which it is separated by an optical system.

FREEMAN H. OWENS.